(12) United States Patent
Aprea et al.

(10) Patent No.: US 7,840,412 B2
(45) Date of Patent: Nov. 23, 2010

(54) AUDIO CODING

(75) Inventors: Javier Francisco Aprea, Eindhoven (NL); Thomas Boltze, Shanghai (CN); Paulus Henricus Antonius Dillen, Eindhoven (NL); Leon Maria Van De Kerkhof, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1550 days.

(21) Appl. No.: 10/501,426

(22) PCT Filed: Dec. 12, 2002

(86) PCT No.: PCT/IB02/05417

§ 371 (c)(1),
(2), (4) Date: Jul. 13, 2004

(87) PCT Pub. No.: WO03/061299

PCT Pub. Date: Jul. 24, 2003

(65) Prior Publication Data

US 2005/0117056 A1 Jun. 2, 2005

(30) Foreign Application Priority Data

Jan. 18, 2002 (EP) .................................. 02075215

(51) Int. Cl.
*G10L 21/04* (2006.01)
(52) U.S. Cl. ..................... 704/503; 704/500; 704/501; 704/502; 704/504

(58) Field of Classification Search .................. 704/201, 704/205, 500–504
See application file for complete search history.

(56) References Cited

U.S. PATENT DOCUMENTS

| | | | |
|---|---|---|---|
| 5,913,190 A | | 6/1999 | Fielder et al. |
| 5,930,251 A | * | 7/1999 | Murakami et al. ...... 370/395.65 |
| 6,124,895 A | * | 9/2000 | Fielder ........................ 348/515 |
| 6,181,383 B1 | | 1/2001 | Fox et al. |
| 6,188,987 B1 | | 2/2001 | Fielder |
| 6,226,608 B1 | * | 5/2001 | Fielder et al. ................ 704/229 |
| 6,262,777 B1 | | 7/2001 | Brewer et al. |
| 6,480,234 B1 | * | 11/2002 | Sasaki et al. ................. 348/512 |

FOREIGN PATENT DOCUMENTS

| | | |
|---|---|---|
| WO | 9832281 | 7/1998 |
| WO | 0249008 A1 | 6/2002 |

\* cited by examiner

*Primary Examiner*—Richemond Dorvil
*Assistant Examiner*—Leonard Saint Cyr

(57) ABSTRACT

An audio encoding scheme or a stream that encodes audio and video data is disclosed. The scheme has particular application in mezzanine-level coding in digital television broadcasting. The scheme has a mean effective audio frame length F that equals the video frame length $1/f_V$ over an integral number M video frames, by provision of audio frames variable in length F in a defined sequence where length=F(j) at encoding. The length of the audio frames may be varied by altering the length of overlap between adjacent frames in accordance with an algorithm that repeats after a sequence of M frames. An encoder and a decoder for such a scheme are also disclosed.

13 Claims, 6 Drawing Sheets

AUDIO CODING

BACKGROUND TO THE INVENTION

1. Field of the Invention

This invention relates to coding of audio signals into a data stream such that it can be edited at points synchronised to another data stream. It has particular, but not exclusive, application to a digital television transmission scheme requiring non-destructive splicing of the audio in the compressed domain at the associated video frame boundaries.

Digital Television (DTV) systems allow several programmes to be broadcast over a channel of limited bandwidth. Each of these programmes has video and audio content. Some of these programmes may contain high quality multichannel audio (e.g., 5 channels that can be reproduced by home cinema systems). DTV production sites, networks and affiliates typically use video tape recorders and transmission lines for carrying all audio content. Much of this infrastructure has capacity for only two uncompressed audio channels, so multiple channels are normally lightly compressed and formatted before recording or transmission. Prior to emission (i.e., broadcasting to end-user) the programme streams are strongly compressed.

In contribution and distribution stages of DTV production, original streams must be spliced for programme editing or programme switching (e.g., for insertion of local content into a live network feed). Such splicing is performed at video frame boundaries within the content stream.

The audio content of the broadcast stream must meet several requirements. DTV viewers may expect received programmes to have a high perceptive audio quality, particularly when the programmes are to be reproduced using high quality reproduction equipment such as in a home cinema system. For example, there should be no audible artefacts due to cascading of multiple encoding and decoding stages, and there should be no perceptible interruption in sound during programme switching. Most importantly, the reproduced programmes must be lip sync; that is to say the audio stream must be synchronous with the corresponding video stream. To achieve these ends at a reasonable cost, i.e., using the existing (2-channel) infrastructure, one must splice the audio programme in the compressed domain.

2. Summary of the Prior Art

An existing mezzanine encoding scheme include Dolby E (r.t.m.) defined in Dolby Digital Broadcast Implementation Guidelines Part No. 91549, Version 2 1998 of Dolby Laboratories for distribution of up to 8 channels of encoded audio and multiplexed metadata through an AES-3 pair. The soon to be introduced (NAB 1999) DP571 Dolby E Encoder and DP572 Dolby E Decoder should allow editing and switching of encoded audio with a minimum of mutes or glitches. Moreover, they allow cascading without audible degradation. Dolby E uses 20-bit sample size and provides a reduction between 2:1 and 5:1 in bitrate.

The British Broadcasting Corporation and others are proposing, through the ACTS ATLANTIC project, a flexible method for switching and editing of MPEG-2 video bitstreams. This seamless concatenation approach uses decoding and re-encoding with side information to avoid cascading degradation. However, this scheme is limited to application with MPEG-2 Layer II and the AES/EBU interface. Moreover, the audio data is allowed to slide with respect to edit points introducing a time offset. Successive edits can result, therefore, in a large time offset between the audio and video information.

Throughout the broadcasting chain, video and audio streams must be maintained in lip sync. That is to say, the audio must be kept synchronous to the corresponding video. Prior to emission, distribution sites may splice (e.g., switch, edit or mix) audio and video streams (e.g., for inclusion of local content). After splicing, if video and audio frame boundaries do not coincide, which is the case for most audio coding schemes, it is not possible to automatically guarantee lip sync due to slip of the audio with respect to the video. In extreme cases, when no special measures are taken, this could lead to audio artefacts, such as mutes or glitches. Glitches may be the result of an attempt to decode a not compliant audio stream while mutes may be applied to avoid these glitches. An aim of this invention is to provide an encoding scheme for an audio stream that can be spliced without introducing audio artefacts such as mutes, glitches or slips.

Another aim of this invention is to provide an encoding scheme that can be subject to cascading compression and decompression with a minimal loss of quality.

SUMMARY OF THE INVENTION

From a first aspect, the invention provides an audio encoding scheme for a stream that encodes audio and video data, which scheme has a mean effective audio frame length F that equals the video frame length $1/f_V$ over an integral number M video frames, by provision of audio frames variable in length F in a defined sequence F(j) at encoding.

This scheme ensures that the stream can be edited at least at each video frame without degradation to the audio information. Preferably, the frame length F may be adjusted by varying an overlap O between successive audio frames.

In schemes embodying the invention, the value F(j) may repeat periodically on j, the periodicity of F(j) defining a sequence of frames. There is typically M video and N audio frames per sequence, each audio frame being composed of k blocks. The total overlap $O_T$ between frames in the sequence may be, for example, equal to $O_T = p \times O + q \times (O+1)$, where O is an overlap length in blocks.

In one scheme within the scope of the invention, only audio frames corresponding to a particular video frame are overlapped. In such a scheme, the values of p and q may meet the following equalities: $p=(N-M)\times(O+1)-O_T$ and $q=(N-M)-p$.

In an alternative scheme, only audio frames corresponding to a particular video sequence are overlapped. In such a scheme, the values of p and q may meet the following equalities: $p=(N-1)\times(O+1)-O_T$ and $q=(N-1)-p$.

In a further alternative scheme, any adjacent audio frames are overlapped. In such a preferred scheme, the values of p and q may meet the following equalities: $p=N\times(O+1)-O_T$ and $q=N-p$. This latter scheme may provide optimal values of overlap for a sequence of video frames M such that $\exists n \in \aleph^+$:

$$n \times t = M \times \left(\frac{f_A}{f_V}\right).$$

We define a video sequence as an integer (and possible finite) number of video frames (i.e., M) at a rate of $f_V$ video frames per second, each video frame containing an equal integer number N of (compressed) audio frames, each audio frame containing an integer number k of blocks, each block representing an integer number t of audio samples at a sampling rate of $f_A$ samples per second. By making the remainder of the division between the number of video frames times the quotient between audio and video frequencies, and the number of audio samples per block of (compressed) audio equal to zero, M is guaranteed to be an integer. Thus, N is also an integer. Consequently, the total number of overlapping blocks is also an integer and so is each single overlap. That the number of overlapping blocks is an integer is, in most cases, a requirement. Blocks of samples are the smallest units of information handled by the underlying codec.

From a second aspect, the invention provides an audio encoding scheme for a stream that carries encoded audio and video data in which scheme audio samples of N quasi video-matched frames are encoded in frames with a semi-variable overlap whereby the effective length of the audio frames coincides with the length of a sequence of M video frames, where M and N are positive integers.

The invention provides a data stream encoded by a scheme according either preceding aspect of the invention. Such a stream may include audio frames, each of which is tagged to indicate the size of the audio frame. The blocks may be similarly tagged to indicate whether the block is a redundant block.

From another aspect this invention provides an audio encoder (that may be implemented for example as a software component or a hardware circuit) for encoding an audio stream according to the first aspect of the invention; and it further provides an audio decoder for decoding an audio stream according to the first aspect of the invention.

An audio decoder according to this aspect of the invention operate by modifying the redundancy status of blocks in the data stream by application of one or more of a set of block operators to each block. This may be accomplished by a set of operators that includes one or more of: NOP, an operator that does not change the status of a block; DROP, an operator that changes the first non-redundant block from the head overlap into a redundant block; APPEND, an operator that changes the first redundant block from the tail overlap into a non-redundant block; and SHIFT, an operator that is a combination of both DROP and APPEND operators.

In particular, the invention provides an audio encoder for coding audio for a stream that encodes audio and video data in which the encoder produces audio frames of variable length such that a mean effective audio frame length $\bar{F}$ equals the video frame length $1/f_V$ over an integral number M video frames, by provision of audio frames variable overlap to have length F in a defined sequence F(j) at encoding.

Such an audio encoder may code a stream to have a short overlap of length O and a total of q long overlaps in a sequence, the encoder calculating the head overlap using an algorithm that repeats after N audio frames.

From a further aspect, the invention provides an audio decoder (that may be implemented for example as a software component or a hardware circuit) for decoding a stream that carries encoded audio and video data, which decoder calculates an expected frame length of an incoming frame F in a, possibly circular shifted, sequence F(j), adjusts the actual length of the incoming frame to make it equal to the expected frame length, determines whether any block within a received frame is a redundant block or a non-redundant block, mapping the non-redundant blocks onto sub-band audio samples.

In systems embodying the invention, there is typically no extra manipulation of the audio, such as sample rate conversion. Moreover, all information needed to correctly decode the received stream is most typically added at the encoder and there is no need to modify this information during editing. Therefore, editing may be done using the existing infrastructure with no modifications. Furthermore, very little extra information need be added to the stream in order to make decoding possible. Last, but not least, when using MPEG as the emission format, it may be convenient to also use an MPEG-like format for transmission.

DETAILED DESCRIPTION OF A PREFERRED EMBODIMENT OF THE INVENTION

An embodiment of the invention will now be described in detail, by way of example only, and with reference to the accompanying drawings, in which.

Figure 1:
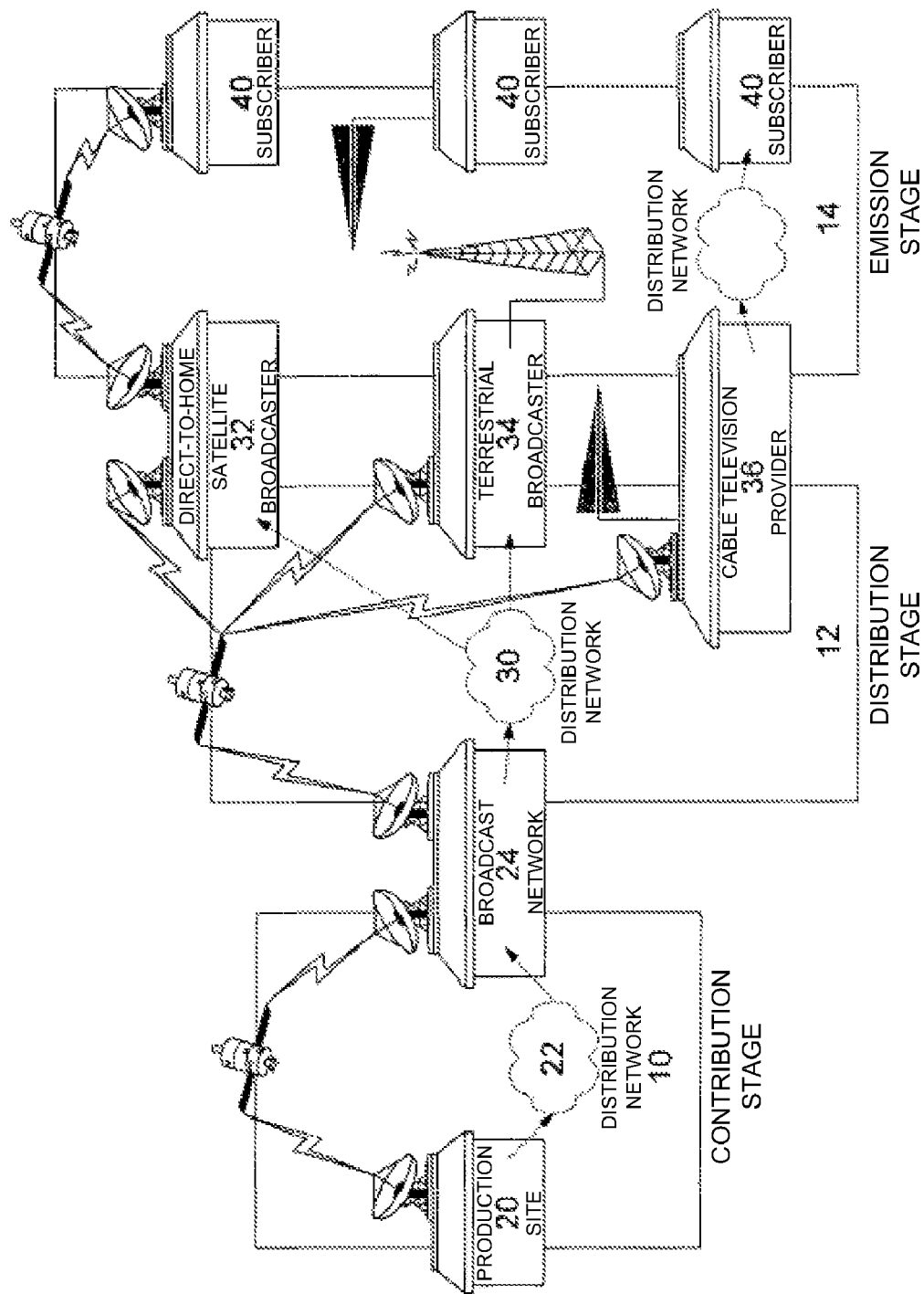
FIG. 1 is a diagram of a typical chain involved in DTV broadcasting.
Figure 2:
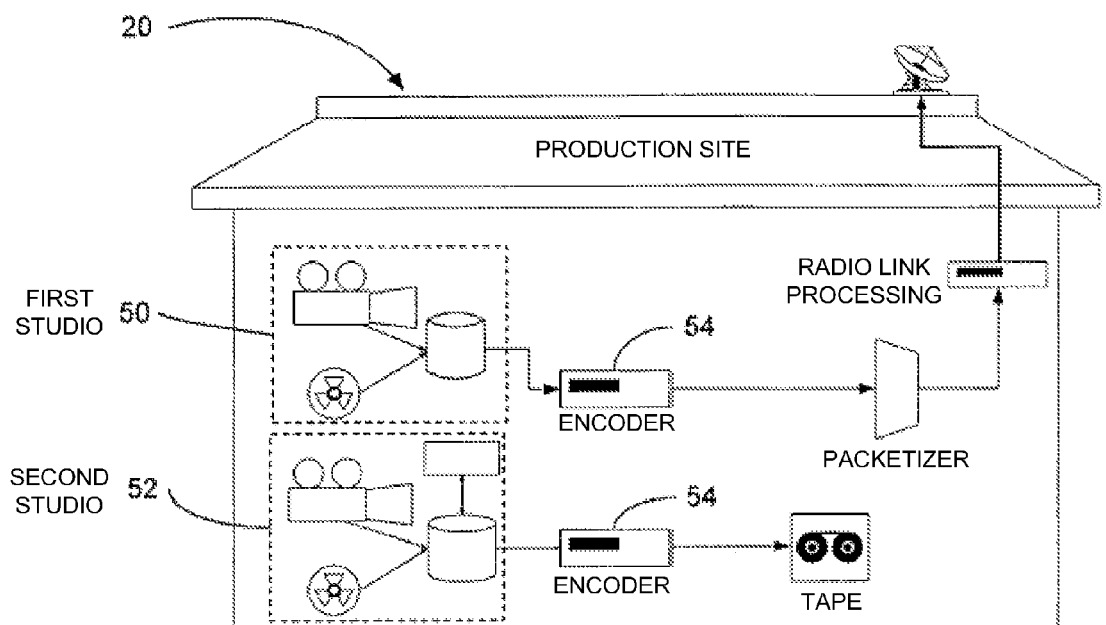
FIG. 2 is a diagram showing the principal components of a typical DTV production site.

In the following description, the following symbols are used throughout:

$f_A$, $f_V$ audio sampling frequency, video frame rate
$t_A$, $t_V$ audio, video frame duration length
s samples per audio frame
k blocks of samples per audio frame
t samples per block
O, $O_T$, $\bar{O}$ short, total and average overlap
M, N quantity of video, audio frames per sequence
p quantity of short overlaps per sequence
q quantity of long overlaps per sequence
j frame index
F(j), G(j) frame's effective length
H(j),T(j) frame's head, tail overlap
X(j), $\bar{X}$(j) accumulated effective length, accumulated mean effective length
$\bar{F}$ mean effective length
b short frame's length
B total number of blocks in video sequence
φ Phase
$\aleph^+$ {1,2,3, . . . ,∞}
Q null padding
A(j) append operation toggle
OP(j) Operator
ε(j) synchronisation error
δ total synchronisation error
u, v auxiliary variables With reference first to FIG. 1, a typical DTV broadcasting system is a chain involving a contribution stage 10, a distribution stage 12 and an emission stage 14.

In the contribution stage, content is originated at one or more production sites 20, and transferred by a distribution network 22 to a broadcast network site 24. The broadcast network 24 produces a programme stream that includes the content, and distributes the programme stream over a distribution network 30 to affiliates, such as a direct-to-home satellite broadcaster 32, a terrestrial broadcaster 34, or a cable television provider 36. A subscriber 40 can then receive the programme stream from the output of one of the affiliates.

Within the production site, content of several types may be produced and stored on different media. For example, a first studio 50 may produce live content and a second studio 52 may produce recorded content (e.g. commercial advertisements). In each case, the content includes a video and an audio component. Output from each studio 50 is similarly processed by a respective encoder 54 and to generate an elementary stream that encodes the audio and video content. The content from the first studio 50, to be broadcast live, is then transmitted to the distribution network 22 by a radio link (after suitable processing). Time is not critical for the content of the second studio, so this may be recorded on tape 56 and sent to the distribution network 22 in an appropriate manner. The encoder 54, and the elementary stream that it produces, are embodiments of aspects of the invention.

Figure 3:
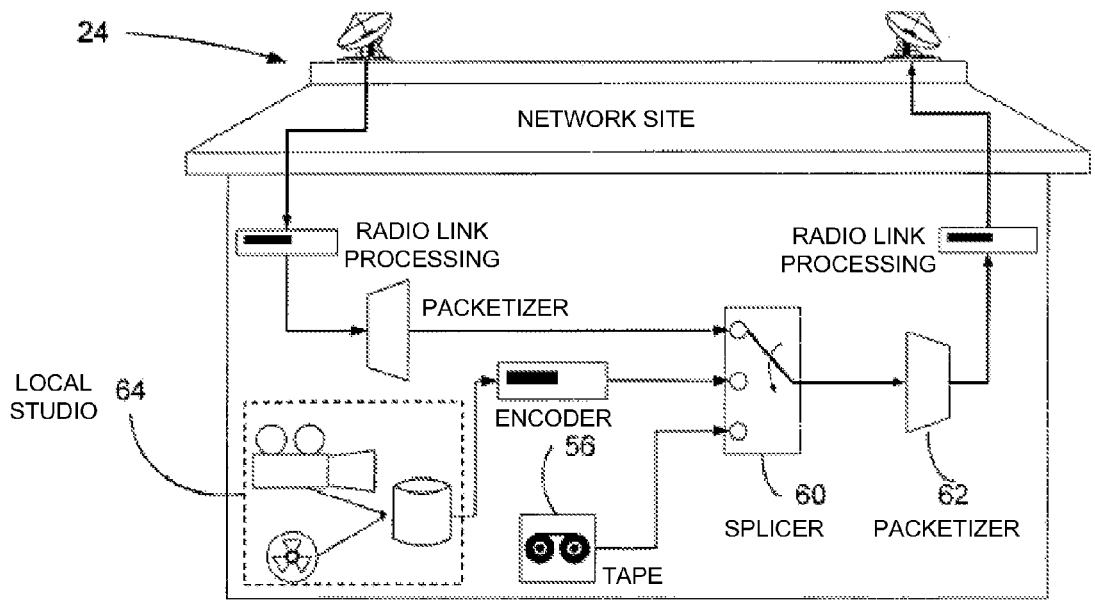
FIG. 3 is a diagram showing the principal components of a typical DTV network site.

Within the network site 24, as shown in FIG. 3, content from various sources is spliced to construct a programme output by a splicer 60. Input to the splicer 60 is derived from elementary streams of similar types that can be derived from various sources such as via a radio link from the production unit 20, a tape 56 or a local studio 64. Output of the splicer 60 is likewise an elementary stream that, at any given time, is a selected one of the input streams. The splicer 60 can be operated to switch between the input streams in a manner that ensures that the audio and video components of the output stream can be seamlessly reproduced. Output of the splicer 60 is then processed by a packetiser 62 to form a transport stream. The transport stream is then modulated for transmission by a radio link to the affiliates for distribution to subscribers.

The video content encoded within an elementary stream embodying the invention will typically comprise a sequence of scanned video frames. Such frames may be progressive scanning video frames, in which case, each frame is a complete still picture. In such cases, the video frames have a frame rate $f_V$ and is of duration $t_V=1/f_V$. Alternatively, the frames may be interlaced scanning frames in which each frame is built up from two successive interlaced fields, the field frequency being $2f_V$ in the notation introduced above. The frame rate and scanning type is defined by the television system for which the stream is intended. Basic TV standards PAL and NTSC derived the frame rates from the mains frequency of the countries where the standards were used. With the introduction of colour, NTSC was modified by a factor 1000/1001. Additionally, film uses 24 Hz, which may be modified by the same factor. Moreover, computer monitors can run at several frame rates up to 96 Hz. Typical values of $f_V$ are given in Table 1, below.

TABLE 1

| Video frame rate [Hz] | $t_V$ [ms] | Application |
| --- | --- | --- |
| 23.976 | 41.71 | 3-2 pull-down NTSC |
| 24 | 41.67 | film |
| 25 | 40 | PAL, SECAM |
| 29.97 | 33.37 | NTSC, PAL-M, SECAM-M |
| 30 | 33.33 | drop-frame NTSC |
| 50 | 20 | double-rate PAL |
| 59.94 | 16.68 | double-rate NTSC |
| 60 | 16.67 | double-rate, drop-frame NTSC |

The audio signal is a time-continuous pulse-code modulated (PCM) signal sampled at a frequency $f_A$, for example, 48 kHz. Example values of $f_A$ are given in Table 2, below.

TABLE 2

| Audio sampling frequency [kHz] | Application |
| --- | --- |
| 24 | DAB |
| 32 | DAT, DBS |
| 44.1 | CD, DA-88, DAT |
| 48 | professional audio, DA-88, DVD |
| 96 | DVD |

Besides these frequencies, it is also possible to find 44.1 and 48 kHz modified by a factor 1000/1001 (e.g., 44.056, 44.144, 47.952 and 48.048 kHz) for conforming audio in pull-up and pull-down film-to-NTSC conversions. Additionally, for film-to-PAL conversions, a 24/25 factor may be applied (e.g., 42.336, 45.937, 46.08 and 50 kHz). Moreover, DAB may use 24 and 48 kHz; DVD-Audio may use 44.1, 88.2, 176.4, 48, 96 and 192 kHz; DVD-Video may use 48 and 96 kHz. DAT is specified for 32, 44.1 and 48 kHz; special versions may use also 96 kHz. Finally, compressed audio at very low bit rates may require lower sampling frequencies (e.g., 16, 22.05 and 24 kHz).

The sample width is typically 16, 20 or 24 bits.

Before compression, the audio stream is divided in audio frames of duration $t_A=s/f_A$, where s is the number of samples per audio frame (e.g., in MPEG-2 Layer II s=1 152 samples; in AC-3 s=1 536 samples). Examples of frame rates used in various coding schemes are shown in Table 3, below.

TABLE 3

| Coding scheme | Use | Frame length [samples] | $t_A$ [ms] @ 48 kHz |
| --- | --- | --- | --- |
| MPEG-1 Layer I | DCC | 384 | 8 |
| MPEG-1 Layer II | DAB, DVB, DVD-V | 1,152 | 24 |
| MPEG-1 Layer III | ISDN, MP3 | 1,152 | 24 |
| MPEG-2 Layer II | DVB, DVD | 1,152 | 24 |
| MPEG-2 AAC | | 1,024 | 21.33 |
| Dolby AC-3 | DVD | 1,536 | 32 |
| Sony ATRAC | MiniDisc | 512 | n.a. |

Inside the audio encoder, audio frames are further divided into k blocks of t samples (e.g., in MPEG-2 Layer II there are 36 blocks of 32 samples). The blocks are the smallest unit of audio to be processed. This may be expressed as s=k×t. Table 4 below presents of examples of frame sub-divisions used in various coding schemes.

TABLE 4

| Coding scheme | k × t [blocks × samples] |
| --- | --- |
| MPEG Layer I | 12 × 32 |
| MPEG Layer II | 36 × 32 |
| MPEG Layer III | 2 × 576 |
| Dolby AC-3 | 6 × 256 |

Throughout the broadcasting chain, video and audio streams must be maintained in lip sync. That is to say, the audio must be kept synchronous to the corresponding video. Prior to emission, distribution sites may splice (e.g., switch, edit or mix) audio and video streams (e.g., for inclusion of local content).

After splicing, if video and audio frame boundaries do not coincide, which is the case for most audio coding schemes, it is not possible to automatically guarantee lip sync. In extreme cases, when no special measures are taken, this could lead to audio artefacts, such as mutes or slips.

Although the various embodiments of the invention can perform an encoding related to existing standards (such as MPEG-1 and MPEG-2) the embodiments are not necessarily backward compatible with these existing standards.

Basis of the Embodiments

In the coding scheme of the present embodiment, the audio samples in N quasi video-matched frames, with a semi-variable overlapping to coincide with a sequence of M video frames. Upon encoding in accordance with an embodiment of the invention, each video frame contains an equal integer number of audio frames. Therefore, editing may be done at video frame boundaries. Upon decoding, redundant samples may be discarded.

Assuming an audio frame is divided in k blocks of t samples, the total overlap $O_T$, in blocks, may be calculated by:

$$O_T = (k \times N) - \left(\frac{M}{t} \times \frac{f_A}{f_V}\right) \quad \text{Equation 1}$$

where M, N, k and t are positive integers and $f_A$ and $f_V$, represent frequencies in Hz, are such that $f_A/f_V$ is a rational number.

For providing cross-fade between edited audio streams within the decoder reconstruction filters, the total overlap $O_T$ is chosen to coincide with an integer number of blocks, as given by:

$$O_T = p \times O + q \times (O+1) \quad \text{Equation 2}$$

where p, q and O are non-negative integers.

Within various embodiments of the invention various approaches can be adopted for spreading the total overlap through the audio frames. That is, by imposing different restrictions one may give different implementations for these embodiments. Three such approaches are referred to herein as:

Approach 1—overlaps within video frame;
  Approach 2—overlaps within sequence of video frames; and
  Approach 3—overlap throughout the video stream.

It can be shown that Approach 3 always offers the smallest possible overlap between two adjacent audio frames, often with the smallest number of video frames per sequence. Therefore, for many applications, this approach will be preferred to the others. However, depending upon the particular application, this may not always be the case.

Approach 1

Figure 4:
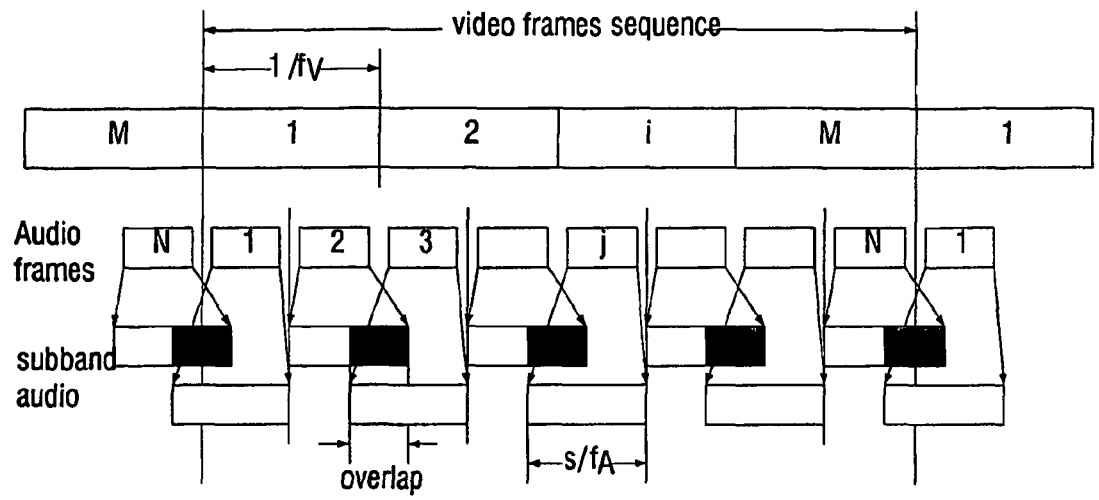
FIG. 4 is diagram that shows the arrangement of audio and video frames within a stream encoded in accordance with a first approach in an embodiment of the invention.

When the overlaps exist only within one video frame, as in FIG. 4, the average overlap $\overline{O}$, in blocks, is given by:

$$\overline{O} = \frac{O_T}{N - M} \quad \text{Equation 3}$$

which may be implemented as $$p = (N-M) \times (O+1) - O_T \quad \text{Equation 4}$$

overlaps of length O blocks and $$q = (N-M) - p \quad \text{Equation 5}$$

overlaps of length (O+1) blocks.

Approach 2

Figure 5:
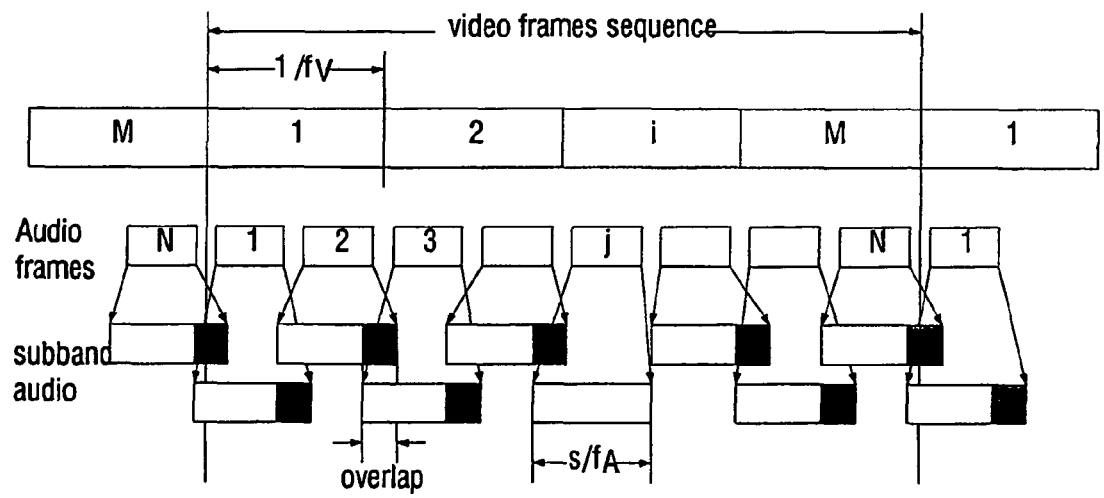
FIG. 5 is diagram that shows the arrangement of audio and video frames within a stream encoded in accordance with a second approach in an embodiment of the invention.

When the overlaps exist only within one sequence, as in FIG. 5, the average overlap $\overline{O}$, in blocks, is given by:

$$\overline{O} = \frac{O_T}{N - 1} \quad \text{Equation 6}$$

which may be implemented as $$p = (N-1) \times (O+1) - O_T \quad \text{Equation 7}$$

overlaps of length O blocks and $$q = (N-1) - p \quad \text{Equation 8}$$

overlaps of length (O+1) blocks.

Approach 3

Figure 6:
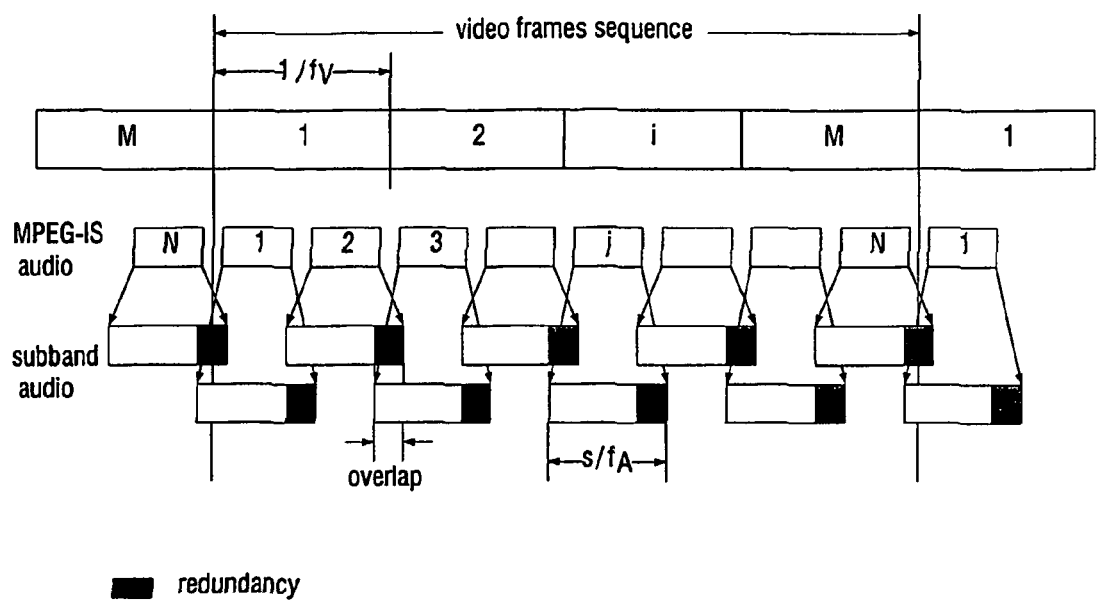
FIG. 6 is diagram that shows the arrangement of audio and video frames within a stream encoded in accordance with a third approach in an embodiment of the invention.

When the overlaps exist within sequences, as in FIG. 6, the average overlap $\overline{O}$, in blocks, is given by:

$$\overline{O} = \frac{O_T}{N} \quad \text{Equation 9}$$

which may be implemented as $$p = N \times (O+1) - O_T \quad \text{Equation 10}$$

overlaps of length O blocks and $$q = N - p \quad \text{Equation 11}$$

overlaps of length (O+1) blocks.

The overlap length O may be expressed as $$O = \lfloor \overline{O} \rfloor \quad \text{Equation 12}$$

which, for the last approach, can be written as:

$$O = \left\lfloor k - \frac{\left(\frac{f_A}{f_V}\right)}{\left(\frac{N}{M}\right) \times t} \right\rfloor \quad \text{Equation 13}$$

M is chosen to satisfy:

$$\frac{N}{M} = \left\lceil \frac{\left(\frac{f_A}{f_V}\right)}{k \times t} \right\rceil \quad \text{Equation 15}$$

and the rate of audio frames per video frame N/M may be written as:

$$\exists n \in \aleph^+ : n \times t = M \times \left(\frac{f_A}{f_V}\right) \quad \text{Equation 14}$$

Cross-Fade

The reconstruction filter in an MPEG-1 decoder as defined in ISO/IEC 11172 "Coding of moving pictures and associated audio for digital storage media at up to about 1.5 Mbit/s" Part 3: Audio (1993-08) is an overlapping filter bank. If splicing is done in the sub-band domain—i.e., blocks—that results on a cross-fade of about 512 audio samples upon decoding.

Implementation of Embodiments Based on Common Coding Standards

Various encoding schemes have been considered as a basis for embodiments of the invention. In particular, MPEG-1 and MPEG-2, Layers I and II have been considered, but this is by no means an exclusive list of possible schemes. It must be said here that schemes embodying the invention use coding schemes similar to existing standards but, due to overlapping, they deviate from these standards.

As will be familiar to those skilled in the technical field, the MPEG-2 is a standard scheme for encoding multichannel audio backward compatible with MPEG-1. On the other hand, a non backwards compatible extension of the MPEG-1 standard to multichannel may offer implementation simplicity. Moreover, Layer II is more efficient than Layer I. On the other hand, Layer I offers less encoding redundancy due to its having a smaller number of blocks. A scheme based on MPEG-1 Layer I may offer the best combination of low redundancy and implementation simplicity in embodiments of the invention.

MPEG-2 Layer II

When using MPEG-2 Layer II as a basis for the encoding scheme, $k=36$ and $t=32$.

Table 5 some examples of overlap sequences for various combinations of audio sample frequencies and video frame rates when the embodiment is based upon Approach 1, as described above.

TABLE 5

MPEG-2 Layer II and Approach 1

| $f_v$ [Hz] | $f_A$ [kHz] | M | N | $O_T$ | $\overline{O}$ | $p \times O + q \times (O + 1)$ |
|---|---|---|---|---|---|---|
| 23.976 | 48 | 16 | 32 | 151 | 9.437... | $9 \times 9 + 7 \times 10$ |
| | 44.1 | 2,560 | 5,120 | 37,173 | 14.520... | $1,227 \times 14 + 1,333 \times 15$ |
| | 32 | 24 | 48 | 727 | 30.291... | $17 \times 30 + 7 \times 31$ |
| 24 | 48 | 2 | 4 | 19 | 9.5 | $1 \times 9 + 1 \times 10$ |
| | 44.1 | 64 | 128 | 933 | 14.578... | $27 \times 14 + 37 \times 15$ |
| | 32 | 3 | 6 | 91 | 30.333... | $2 \times 30 + 1 \times 31$ |
| 25 | 48 | 1 | 2 | 12 | 12 | $1 \times 12 + 0 \times 13$ |
| | 44.1 | 8 | 16 | 135 | 16.875 | $1 \times 16 + 7 \times 17$ |
| | 32 | 1 | 2 | 32 | 32 | $1 \times 32 + 0 \times 33$ |
| 29.97 | 48 | 20 | 40 | 439 | 21.95 | $1 \times 21 + 19 \times 22$ |
| | 44.1 | 3,200 | 6,400 | 83,253 | 26.016... | $3,147 \times 26 + 53 \times 27$ |
| | 32 | n/a | n/a | n/a | n/a | n/a |

Table 6 shows some examples of overlap sequences for diverse combinations of audio sample frequencies and video frame rates when the embodiment is based upon Approach 2, as described above.

TABLE 6

MPEG-2 Layer II and Approach 2

| $f_v$ [Hz] | $f_A$ [kHz] | M | N | $O_T$ | $\overline{O}$ | $p \times O + q \times (O + 1)$ |
|---|---|---|---|---|---|---|
| 23.976 | 48 | 16 | 32 | 151 | 4.870... | $4 \times 4 + 27 \times 5$ |
| | | 32 | 64 | 302 | 4.793... | $13 \times 4 + 50 \times 5$ |
| | | 48 | 96 | 453 | 4.768... | $22 \times 4 + 73 \times 5$ |
| | 44.1 | 2,560 | 5,120 | 37,173 | 7.261... | $3,779 \times 7 + 1,340 \times 8$ |
| | 32 | 24 | 48 | 727 | 15.468... | $25 \times 15 + 22 \times 16$ |
| | | 48 | 96 | 1,454 | 15.305... | $66 \times 15 + 29 \times 16$ |
| | | 72 | 144 | 2,181 | 15.251... | $107 \times 15 + 36 \times 16$ |
| 24 | 48 | 2 | 4 | 19 | 6.333... | $2 \times 6 + 1 \times 7$ |
| | | 10 | 20 | 95 | 5 | $19 \times 5 + 0 \times 6$ |
| | | 48 | 96 | 456 | 4.8 | $19 \times 4 + 76 \times 5$ |
| | 44.1 | 64 | 128 | 933 | 7.346... | $83 \times 7 + 44 \times 8$ |
| | | 128 | 256 | 1,866 | 7.317... | $174 \times 7 + 81 \times 8$ |
| | | 192 | 384 | 2,799 | 7.308... | $265 \times 7 + 118 \times 8$ |
| | 32 | 3 | 6 | 91 | 18.2 | $4 \times 18 + 1 \times 19$ |
| | | 6 | 12 | 182 | 16.545... | $5 \times 16 + 6 \times 17$ |
| | | 24 | 48 | 728 | 15.489... | $24 \times 15 + 23 \times 16$ |
| 25 | 48 | 1 | 2 | 12 | 12 | $1 \times 12 + 0 \times 13$ |
| | | 2 | 4 | 24 | 8 | $3 \times 8 + 0 \times 9$ |
| | | 7 | 14 | 84 | 6.461... | $7 \times 6 + 6 \times 7$ |
| | 44.1 | 8 | 16 | 135 | 9 | $15 \times 9 + 0 \times 10$ |
| | | 72 | 144 | 1,215 | 8.496... | $72 \times 8 + 71 \times 9$ |
| | 32 | 1 | 2 | 32 | 32 | $1 \times 32 + 0 \times 33$ |
| | | 2 | 4 | 64 | 21.333... | $2 \times 21 + 1 \times 22$ |
| | | 17 | 34 | 544 | 16.484... | $17 \times 16 + 16 \times 17$ |
| 29.97 | 48 | 20 | 40 | 439 | 11.256... | $29 \times 11 + 10 \times 12$ |
| | | 40 | 80 | 878 | 11.113... | $70 \times 11 + 9 \times 12$ |
| | | 220 | 440 | 4,829 | 11 | $439 \times 11 + 0 \times 12$ |
| | 44.1 | 3200 | 6,400 | 83,253 | 13.010... | $6,333 \times 13 + 66 \times 14$ |
| | | 6400 | 12,800 | 166,506 | 13.009... | $12,680 \times 13 + 119 \times 14$ |
| | 32 | 30 | 30 | 79 | 2.724... | $8 \times 2 + 21 \times 3$ |
| | | 60 | 60 | 158 | 2.677... | $19 \times 2 + 40 \times 3$ |
| | | 90 | 90 | 237 | 2.662... | $30 \times 2 + 59 \times 3$ |

Table 7 shows overlap sequences for various combinations of audio sample frequencies and video frame rates when the embodiment is based upon Approach 3, as described above.

TABLE 7

MPEG-2 Layer II and Approach 3

| $f_v$ [Hz] | $f_A$ [kHz] | M | N | $O_T$ | $\overline{O}$ | $p \times O + q \times (O + 1)$ |
|---|---|---|---|---|---|---|
| 23.976 | 48 | 16 | 32 | 151 | 4.718... | $9 \times 4 + 23 \times 5$ |
| | 44.1 | 2,560 | 5,120 | 37,173 | 7.260... | $3,787 \times 7 + 1,333 \times 8$ |
| | 32 | 24 | 48 | 727 | 15.145... | $41 \times 15 + 7 \times 16$ |
| 24 | 48 | 2 | 4 | 19 | 4.75 | $1 \times 4 + 3 \times 5$ |
| | 44.1 | 64 | 128 | 933 | 7.289... | $91 \times 7 + 37 \times 8$ |
| | 32 | 3 | 6 | 91 | 15.166... | $5 \times 15 + 1 \times 16$ |
| 25 | 48 | 1 | 2 | 12 | 6 | $2 \times 6 + 0 \times 7$ |
| | 44.1 | 8 | 16 | 135 | 8.437... | $9 \times 8 + 7 \times 9$ |
| | 32 | 1 | 2 | 32 | 16 | $2 \times 16 + 0 \times 17$ |
| 29.97 | 48 | 20 | 40 | 439 | 10.975 | $1 \times 10 + 39 \times 11$ |
| | 44.1 | 3200 | 6400 | 83,253 | 13.008... | $6,347 \times 13 + 53 \times 14$ |
| | 32 | 30 | 30 | 79 | 2.633... | $11 \times 2 + 19 \times 3$ |

MPEG-2 Layer I

When using MPEG-2 Layer I as the encoding scheme, k=12 and t=32. By using Approach 3, we obtain the sequences shown in Table 8.

TABLE 8

MPEG-2 Layer I and Approach 3

| $f_v$ [Hz] | $f_A$ [kHz] | M | N | $O_T$ | $\overline{O}$ | $p \times O + q \times (O + 1)$ |
|---|---|---|---|---|---|---|
| 23.976 | 48 | 16 | 96 | 151 | 1.572... | $41 \times 1 + 55 \times 2$ |
| | 44.1 | 2,560 | 12,800 | 6,453 | 0.504... | $6,347 \times 0 + 6,453 \times 1$ |
| | 32 | 24 | 96 | 151 | 1.572... | $41 \times 1 + 55 \times 2$ |
| 24 | 48 | 2 | 12 | 19 | 4.75 | $5 \times 1 + 7 \times 2$ |
| | 44.1 | 64 | 384 | 933 | 2.429... | $219 \times 2 + 165 \times 3$ |
| | 32 | 3 | 12 | 19 | 1.583... | $5 \times 1 + 7 \times 2$ |
| 25 | 48 | 1 | 5 | 0 | 0 | $5 \times 0 + 0 \times 1$ |
| | 44.1 | 8 | 40 | 39 | 0.975 | $1 \times 0 + 39 \times 1$ |
| | 32 | 1 | 4 | 8 | 2 | $4 \times 2 + 0 \times 3$ |
| 29.97 | 48 | 20 | 100 | 199 | 1.99 | $1 \times 1 + 99 \times 2$ |
| | 44.1 | 3,200 | 12,800 | 6,453 | 0.504... | $6,347 \times 0 + 6,453 \times 1$ |
| | 32 | 30 | 90 | 79 | 0.877... | $11 \times 0 + 79 \times 1$ |

It should be noted that the average redundancy is much less than is the case when using Layer II.

MPEG-1

Another simplification that could be applied to embodiments is the use of MPEG-1 as the basis for the encoding scheme. In this case, the upper limit of two channels (e.g., stereo) of MPEG-1 can be extended to n channels. Therefore, each channel can have a bit allocation dependent on the total bit availability and on audio content per channel.

Algorithms

In the following section, algorithms applicable to calculating overlaps according to Approach 3 will be described.

Encoding

An encoder for creating an embodiment stream creates a sequence of frames of a predetermined structure. Each frame j has the structure shown in Table 9 below, where k is the total number of blocks, H(j) is the number of blocks in the head overlap and T(j) is the number of blocks in the tail overlap.

TABLE 9

| H(j) | k − [H(j) + T(j)] | T(j) |
|---|---|---|

Note that T(j) = H(j + 1).

Knowing the value of N, O and q, the encoder may calculate the exact head overlap using the following algorithm.

```
while (new frame) {
    if (counter >= N || counter == 0) {
        overlap = O + 1;
        counter = counter % N;
    }
    else overlap = O;
    return (overlap);
    counter = counter + q;
}
```

In the case of MPEG-2 Layer II, $f_v$=24 Hz and $f_A$=48 kHz, we have from Table 7 that N=4, O=4 and q=3. That generates the following sequence of head overlaps: 5, 4, 5 and 5, or any circular shift thereof.

Every audio frame must be tagged to indicate its size. In the above-described scheme, the head overlap may be only O or O+1 long. Therefore, it is possible to use a 1-bit tag to differentiate short and long frames.

The useful size F(j) of the frame j within a video sequence is given by:

$$F(j)=k-H(j+1) \qquad \text{Equation 16}$$

Every block must be tagged to indicate its redundancy. In the above-described scheme, the block may be only redundant or not redundant. Therefore, it is possible to use a 1-bit tag to differentiate redundant and non-redundant blocks.

Recording and Transmission

Although redundant information must be encoded, it need not all be transmitted. This saves bitrate in the transmitted stream. The minimum total number of blocks $B_{min}$ to be recorded or transmitted within a video sequence, is given by:

$$B_{min} = \left(k - \left\lceil \frac{O_T}{N} \right\rceil \right) \times N + p \qquad \text{Equation 17}$$

An extra redundant block per audio frame may be needed to allow for editing the encoded stream. In this case, the maximum total number of blocks $B_{MAX}$, to be recorded or transmitted within a video sequence, is given by:

$$B_{MAX} = \left(k - \left\lfloor \frac{O_T}{N} \right\rfloor \right) \times N + p \qquad \text{Equation 18}$$

A phase φ may be defined to indicate the relative start, in blocks, of the encoded stream with respect to the first video frame in the video sequence. A suitable choice for φ is:

$$\varphi = \left\lceil \frac{O}{2} \right\rceil \qquad \text{Equation 19}$$

Moreover, the encoder generates null padding Q to complete the stream in accordance with the IEC61937 standard. The length of padding depends not only on the payload length but has also to take into consideration video boundaries to avoid a cumulative error being introduced into the encoded stream.

Editing

Editing of the stream encoded in accordance with the embodiment may be performed at video frame boundaries by adding, removing or appending frames. The decoder corrects the errors that may be generated by editing using information available within the decoder (such as values of $f_A$ and $f_V$) or information generated by the encoder (such as size tags). No additional information need be recorded or transmitted as a result of editing. Moreover, cross-fade at the editing point may be provided by a reconstruction filter bank within the decoder.

Decoding

A decoder for decoding a stream calculates the expected useful size F(j) for the current frame j. Moreover, it reads a size tag from the incoming frame to determine the actual useful size G(j).

Blocks within an audio frame may have one of two statuses: redundant or non-redundant. Non-redundant blocks are recorded, transmitted and decoded into sub-band samples. Redundant blocks (such as the first redundant block in the tail overlap) may be recorded and transmitted in order to ease the decoding process. However, redundant blocks are never decoded into sub-band samples.

For modifying the status of an overlap block, four operators are defined: NOP, DROP, APPEND and SHIFT.

NOP: The NOP operator does not change the status of blocks.

DROP: The DROP operator changes the first non-redundant block from the head overlap into a redundant block.

APPEND: The APPEND operator changes the first redundant block from the tail overlap into a non-redundant block.

SHIFT. The shift operator is a combination of both DROP and APPEND operators.

The decoding of frames in a stream embodying the invention into sub-band samples is referred to as mapping. Only non-redundant blocks are mapped into sub-band samples. If the incoming frame is larger than expected, the operator DROP is applied. Conversely, if the incoming frame is smaller than expected the operator APPEND is applied. When the actual size equals the expected size, the decoder looks to the previous frame. If the previous frame has been appended or shifted, the operator SHIFT is applied, otherwise, the incoming frame is mapped without modification.

Synchronization Error

A stream embodying the invention is based upon the creation of a mean effective audio frame length $\overline{F}$ that equals the video frame length $1/f_V$ by alternation of long (i.e., tagged) and short frames in a defined sequence F(j) at encoding. The redundancy needed for reproducing the previous defined sequence F(j) of long and short frames at decoding, despite the actual length G(j) of the incoming frames after editing, is obtained by overlapping frames at editing points. At editing, the synchronisation error ε(j), in blocks, due to swapping frames may be expressed by $$\varepsilon(j) = \left(j \times \frac{p}{N}\right) - \left\lfloor j \times \frac{p}{N} \right\rfloor. \qquad \text{Equation 20}$$

At any time one may write $$j \times p = u + N \times v, \qquad \text{Equation 21}$$

with u∈{0,1,2,...,N−1} and v∈{0,1,2,...,p}. By substitution, it follows $$\varepsilon(j) = \frac{u}{N}, \qquad \text{Equation 22}$$

whence $0 \leq \varepsilon_{MAX} < 1 - 1/N$ Upon decoding, those redundancies are discarded appropriately by using operators NOP, DROP, APPEND and SHIFT as described above. Moreover, the incoming frame G(j) may be delayed by one block due to a DROP or SHIFT operation. Therefore, it can be shown that the total synchronisation error δ introduced by the process is bound, as follows:

$$\Delta t = 0 \Rightarrow \delta \in \left[0, 1 - \frac{1}{N}\right) \wedge \Delta t = -1 \Rightarrow \delta \in \left[-1, -\frac{1}{N}\right) \qquad \text{Equation 23}$$

with limits:

$$-1 \leq \delta_{MAX} < 1 \qquad \text{Equation 24}$$

Cascading

Several cascading levels of lossy encoding and decoding may degrade the signal. However, the use of low compression rates at contribution and distribution, use of metadata relating to the compressed signals and special techniques can be employed to keep this degradation imperceptible to the end-user. Methods applicable to MPEG encoding are known to those working in the technical field (for example, as described in "Maintaining Audio Quality in Cascaded Psychoacoustic Coding", Warner R. Th. ten Kate 101st AES Convention 1996 Nov. 8-11), which may be used with embodiments of the invention to maintain the quality of the audio signal throughout the DTV broadcasting chain.

EXAMPLES OF THE INVENTION

Block Arrangement

Figure 8:
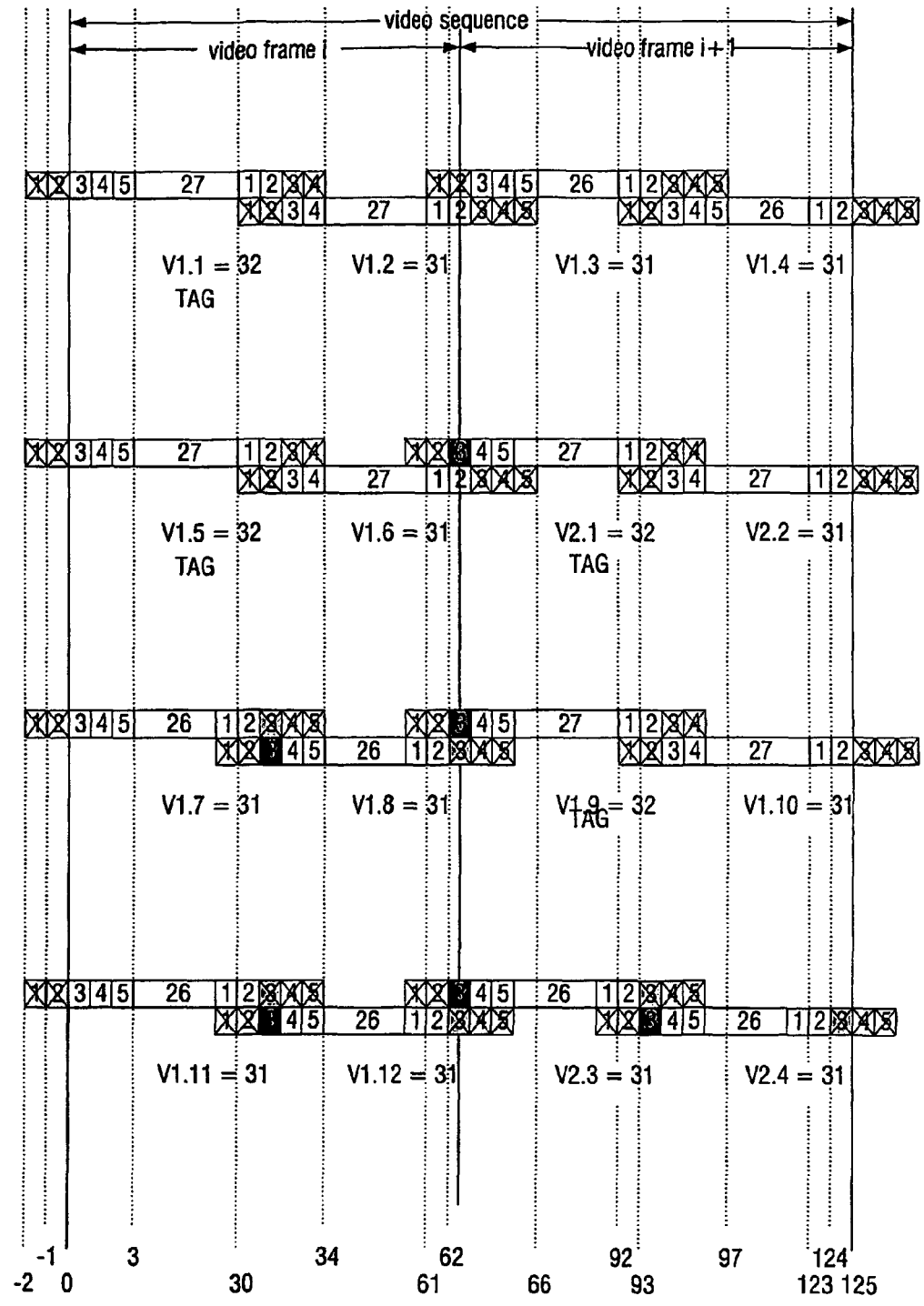
FIG. 8 is a diagram of the arrangement of blocks in a stream encoded by an embodiment of the invention.

The audio frame sequence, encoded in accordance with an embodiment of this invention, for film and professional audio based on MPEG-2 Layer II and approach 3 overlaps is shown in Table 10. All possible arrangement of blocks after decoding the stream, according to another embodiment of this invention, are shown in FIG. 8. The parameters are as follows (referring to the list of symbols, above):

video frame rate $f_V$=24 Hz, video frame length $t_V$=41.67 ms;

audio sampling frequency $f_A$=48 kHz, audio frame length $t_A$=24 ms;

k=36 blocks, t=32 samples;

M=2 video frames, N=4 audio frames;

overlap: $O_T$=19 blocks, $\overline{O}$=4.75 blocks, O=4 blocks, O+=5 blocks;
p=1 short overlap, q=3 long overlaps;
b=31 blocks, b+1=32 blocks;
$B_{min}$=125, $B_{MAX}$=129, $\phi$=2 blocks;
$\epsilon_{MAX}$=0.75 block, $$\delta \in \begin{cases} [0, 0.75] \Leftarrow \Delta t = 0 \\ [-1, -0.25] \Leftarrow \Delta t = -1 \end{cases}$$

TABLE 10

| j | 1 | 2 | 3 | 4 |
|---|---|---|---|---|
| H(j) | 5 | 4 | 5 | 5 |
| F(j) | 32 | 31 | 31 | 31 |

Application of the System to the IEC61937 Standard

Figure 7:
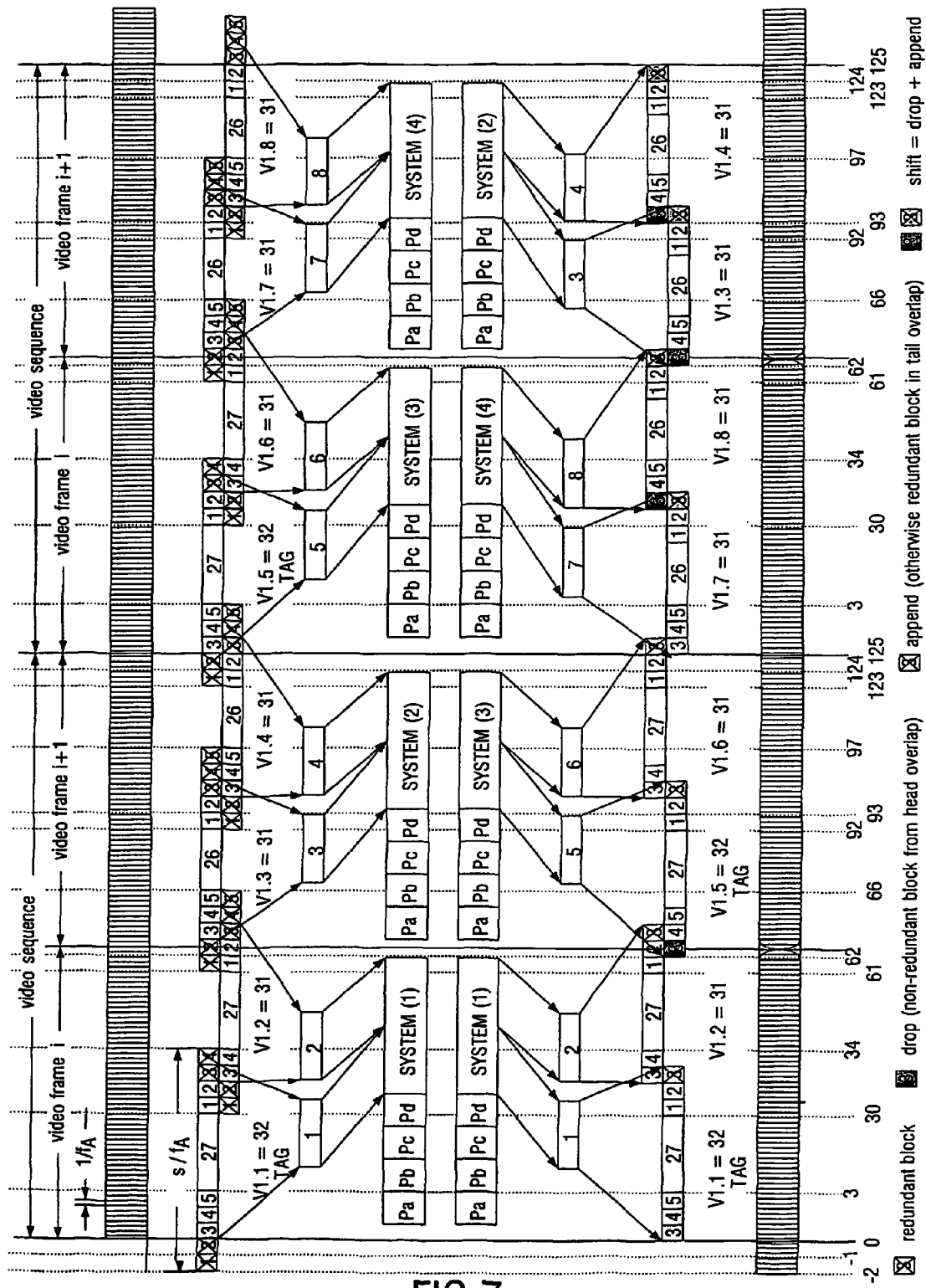
FIG. 7 shows the bit allocation of a stream embodying the invention, based on MPEG-2 Layer II, for NTSC and 48 kHz audio in IEC61937.

A suitable standard for transmitting the stream embodying the invention, is the IEC61937 standard ('Interface for non-linear PCM encoded audio bitstreams applying IEC 60958'). In the stream allocation shown in FIG. 7 for the previous example:

The IEC61937 frame has a length ($^{16}/_{32}$)×3.072 Mbit/s/$f_V$. For $f_V$=24 Hz, it corresponds to 64,000 bits.

The preambles: Pa=F872h, syncword 1; Pb=4E1Fh, syncword 2; Pc=burst information; Pd=number of bits<65 536, length code.

Repetition period of data-burst is a number of IEC60958 frames.

Relative timing accuracy between audio and video after editing a VTR tape and delays introduced by switcher systems gap determine the minimum gap needed between two frames. This so-called splicing gap may be obtained by means of null-frame stuffing.

This can be summarised as:

Stuffing=splicing gap+burst spacing; splicing gap=tape+ switch inaccuracy; burst spacing=4×IEC60958 "0" sub-frames, each 4096×IEC60958 frames.

Burst-payload: System frame=(N/M)×[System sub-frame–head overlap]; N=4; M=2; N/M=2.

If the stream embodying the invention is based on MPEG-2 Layer II for 5.1 channels at 384 kbit/s the system requires at most 45,504 bits (2×[(1,152−4×32)×384/ 48+(2,047−4×32/ 1,152×2,047)×8]+0).

Instead, if the stream embodying the invention is based on an 6-channel version of MPEG-1 Layer II at 192 kbit/s per channel for 6 channels, it would require at most 49,152 bits (2×(1,152−4×32)×6×192/48+0). If we take into account that the LFE channel requires only 12 samples per frame, the effective bitrate would be approximately 230 kbit/s per channel.

The invention claimed is:

1. A method of audio encoding a data stream signal that carries audio and video data, including:

receiving audio and video data, via an input data stream signal;

encoding, via an encoder implemented in hardware, the audio data of the input data stream signal, for an integer number of N audio frames of the audio data, to have a mean effective audio frame length $\overline{F}$ that equals a video frame length $1/f_V$ over an integer number of M frames of a sequence of video data, where $f_V$ equals a video frame rate of the video data, wherein the encoding includes varying, using the encoder implemented in hardware, effective audio frame lengths F of the audio frames per a respective audio frame index j in a defined sequence of effective audio frame lengths F(j) for the sequence of M frames of video data, wherein each respective audio frame, index j, has a structure that includes (i) a number of blocks in a head overlap H(j), (ii) a number of blocks in a tail overlap T(j), and (iii) a number of blocks in between the head overlap and the tail overlap equal to a total number of blocks in the audio frame k minus the quantity of the sum of the head overlap H(j) plus the tail overlap T(j), further wherein the head overlap comprises a length of only (a) overlap O or (b) overlap O+1 long, which enables each audio frame to be tagged via a 1-bit tag to indicate its size and differentiate between short and long audio frames, and wherein each block of the audio frame is tagged via a 1-bit tag to indicate its redundancy so as to differentiate redundant and non-redundant blocks of the respective frame; and outputting a data stream signal that carries encoded audio and video data, wherein the output data stream signal can be spliced at each video frame of the sequence of M video frames without degradation to audio information of the audio data of corresponding audio frames.

2. The method of claim 1, wherein the effective frame length F is adjusted by varying the overlap O between successive audio frames.

3. The method of claim 1, wherein the value F(j) repeats periodically on j, the periodicity of F(j) defining the sequence of audio frames within the sequence of video frames.

4. The method of claim 3 having M video and N audio frames per sequence, each audio frame being composed of k blocks of t samples each.

5. The method of claim 4, wherein a total overlap $O_T$ between audio frames in the corresponding sequence is equal to $O_T$=p×O+q×(O+1), where O is an overlap length in blocks where p∈$\aleph$, q∈$\aleph$, O∈$\aleph$, $O_T$∈$\aleph$.

6. The method of claim 5, wherein only audio frames corresponding to a particular video frame are overlapped.

7. The method of claim 6, wherein p=(N−M)×(O+1)−$O_T$ and q=(N−M)−p.

8. The method of claim 5, wherein only audio frames corresponding to a particular video sequence are overlapped.

9. The method of claim 8, wherein p=(N−1)×(O+1)−$O_T$ and q=(N−1)−p.

10. The method of claim 5, wherein any adjacent audio frames are overlapped.

11. The method of claim 10, wherein p=N×(O+1)−$O_T$ and q=N−p.

12. The method of claim 4 in which ∃n∈$\aleph^+$:

$$n \times t = M \times \left(\frac{f_A}{f_V}\right).$$

13. A method of audio encoding a data stream signal that encodes audio and video data, including:

receiving frames of audio and video data, via an input data stream signal;

encoding, via an encoder implemented in hardware, audio samples of N quasi video-matched audio frames of the input data stream signal into frames with a defined sequence of overlap lengths, wherein the encoded audio samples have a mean effective audio frame length $\overline{F}$ that equals a video frame length $1/f_V$ over an integer number of M frames of a sequence of the video data, where $f_V$ equals a frame rate of the video data, wherein an effective length of the defined sequence of overlap lengths of the encoded audio frames coincides with a length of a sequence of M video frames, where M and N are positive integers, wherein the encoding includes varying, using the encoder implemented in hardware, effective audio frame lengths F of the audio frames per a respective audio frame index j in a defined sequence of effective audio frame lengths F(j) for the sequence of M frames of video data, wherein each respective audio frame, index j, has a structure that includes (i) a number of blocks in a head overlap H(j), (ii) a number of blocks in a tail overlap T(j), and (iii) a number of blocks in between the head overlap and the tail overlap equal to a total number of blocks in the audio frame k minus the quantity of the sum of the head overlap H(j) plus the tail overlap T(j), further wherein the head overlap comprises a length of only (a) overlap O or (b) overlap O+1 long, which enables each audio frame to be tagged via a 1-bit tag to indicate its size and differentiate between short and long audio frames, and wherein each block of the audio frame is tagged via a 1-bit tag to indicate its redundancy so as to differentiate redundant and non-redundant blocks of the respective frame; and outputting a data stream signal that carries encoded audio and video data, wherein the output data stream signal can be spliced at each video frame of the sequence of M video frames without degradation to audio information of the audio data of corresponding audio frames.

* * * * *